(12) United States Patent
Agrawal et al.

(10) Patent No.: US 8,893,288 B2
(45) Date of Patent: *Nov. 18, 2014

(54) PREVENTION OF INFORMATION LEAKAGE FROM A DOCUMENT BASED ON DYNAMIC DATABASE LABEL BASED ACCESS CONTROL (LBAC) POLICIES

(75) Inventors: Sheshnarayan Agrawal, Bangalore (IN); Mukesh K. Mohania, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/539,816

(22) Filed: Jul. 2, 2012

(65) Prior Publication Data

US 2014/0007180 A1 Jan. 2, 2014

(51) Int. Cl.
| | | |
|---|---|---|
| G06F 7/04 | (2006.01) | |
| G06F 21/60 | (2013.01) | |
| G06F 21/62 | (2013.01) | |
| H04L 29/06 | (2006.01) | |

(52) U.S. Cl.
CPC ............ *G06F 21/60* (2013.01); *G06F 21/6209* (2013.01); *G06F 21/6227* (2013.01); *H04L 63/20* (2013.01)
USPC ..................................... 726/26; 726/1; 726/2

(58) Field of Classification Search
CPC ... H04L 63/0428; H04L 63/20; G06F 21/622; G06F 2221/2141; G06F 21/60; G06F 21/62; G06F 21/6097
See application file for complete search history.

(56) References Cited

U.S. PATENT DOCUMENTS

| | | | |
|---|---|---|---|
| 7,401,082 B2 | 7/2008 | Keene et al. | |
| 7,748,027 B2 | 6/2010 | Patrick | |
| 7,831,571 B2 | 11/2010 | Roy et al. | |
| 2006/0075228 A1* | 4/2006 | Black et al. | 713/167 |
| 2007/0094594 A1 | 4/2007 | Matichuk et al. | |
| 2008/0204788 A1 | 8/2008 | Kelly et al. | |
| 2009/0112867 A1* | 4/2009 | Roy et al. | 707/9 |
| 2009/0164878 A1 | 6/2009 | Cottrille | |
| 2010/0010968 A1* | 1/2010 | Redlich et al. | 707/3 |
| 2011/0265177 A1 | 10/2011 | Sokolan et al. | |

* cited by examiner

*Primary Examiner* — Shewaye Gelagay
(74) *Attorney, Agent, or Firm* — Mohammed Kashof; Arnold B. Bangali (57) ABSTRACT

In a method for preventing information leakage in a workflow environment, a computer system receives a request to access documents in a repository. In one aspect, the computer system identifies articles in the document against the access credentials of the requestor. Further, the computer system extracts protected information from rows and columns in the articles based on label access controls. In another aspect, the computer system generates protected values in the extracted protected information from the rows and generating protected patterns in the extracted protected information from the columns. The computer system redacts the generated protected value and the generated protected patterns based on the access credentials of the requestor.

11 Claims, 5 Drawing Sheets

PREVENTION OF INFORMATION LEAKAGE FROM A DOCUMENT BASED ON DYNAMIC DATABASE LABEL BASED ACCESS CONTROL (LBAC) POLICIES

FIELD OF INVENTION

The present invention relates generally to redaction of documents based on access control policies, and more particularly to dynamic redaction of unstructured information in documents based on label based access control (LBAC) policies that are uniquely defined in a database for one or more requestors with privileged access to view the unstructured information from documents.

BACKGROUND

The Information Age, also known as the Digital Age or Computer Age is characterized by the ability to generate, process, transfer, and share information in a negligible amount of time. The Information Age is also defined by concealment of sensitive or confidential information, whose disclosure can be protected from unauthorized access or public leakage.

In business environments, including, for example, the healthcare or financial industries, sensitive or confidential information can be distributed based on a user's privilege to access and also view the information. For example, information including names, addresses, and social security numbers, that are sensitive or confidential to a business service, can be contained in either or both structured relational databases or unstructured content repositories. Structured information is information that is already structured in fields, such as, for example, "data", "title", "subject", "unit price", "quantity", "total price" or "commission percentage".

Further, structured information can be stored in a record of a relational database table. In addition, when information is structured in a relational database table, for example, spreadsheets, columns, row etc., it is usually relatively easy to search the structured information in the relational database. On the other hand, unstructured information refers to information that either does not have a pre-defined data model and/or does not fit well into relational tables. Examples of unstructured information may include books, journals, documents, metadata, health records, audio, video, files, and unstructured text such as the body of an e-mail message, Web page, or word processor document. Further, while the main content being conveyed in unstructured information does not have a defined structure, it generally comes packaged in objects (e.g., in files or documents) that themselves have structure and are thus a mix of structured and unstructured information, but collectively this is still referred to as unstructured information. For example, an HTML web page is tagged, but HTML mark-up is typically designed solely for rendering. It does not capture the meaning or function of tagged elements in ways that support automated processing of the information content of the page.

Thus, the context of unstructured information results in irregularities and ambiguities that make it difficult for relational database engines to understand the unstructured information. Further, sensitive information present in unstructured content repositories that is also present in structured relational databases cannot be easily protected from leakage of the information to a user whom might not have access or privilege to view the information. Therefore, sensitive information present in unstructured content repositories need to be redacted or sanitized to prevent information leakage from the unstructured document, while also taking into consideration that the information may be in a structured relational database.

Current solutions that attempt to address these problems are typically focused on redaction of documents based on manually defined static dictionaries. For, example, in Chab Cumby, Rayid Ghani, "A Machine Learning Based System for Semi-Automatically Redacting Documents" (2011), *Proceedings of the 23rd Annual Conference on Innovative Applications of Artificial Intelligence (IAAI)*, the authors attempt to improve a way to redact documents based on semi-automatically redacting information in documents using machine learning techniques and standard NLP algorithms. Further, specific current solutions involve redaction of information based on dictionaries of protected entities, i.e., explicit values. For example, commonly owned U.S. Pat. No. 7,831,571 B2 describes redaction of documents based on exploitation of a database of entities to identify pre-defined terms to be removed from the document.

SUMMARY

In one embodiment, a method is provided for preventing information leakage in a workflow environment. The method includes a computer system receiving a request to access documents in a repository based on access credentials of a requestor. The method further includes the computer system identifying articles in the document and matching the articles against the access credentials of the requestor. The method further includes the computer system extracting structured information in the document in response to the match. The method further includes the computer system extracting protected information from rows and extracting protected information from columns in the articles of the extracted structured information based on label access controls defined in a database based on access credentials of the requestor. The method further include the computer system generating protected values in the extracted protected information from the rows and generating protected patterns in the extracted protected information from the columns. The method further includes the computer system redacting the generated protected value and the generated protected patterns based on the access credentials of the requestor. The method further includes the computer system presenting the redacted document to the requestor.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying figures, wherein like reference numerals indicate like components, and:

DETAILED DESCRIPTION

The present invention comprises functionality for identifying and dynamically redacting unstructured information in documents based on label based access control (LBAC) security policies defined in a database for a set of one or more requestors or users who have privileged access to view the unstructured information in the documents stored in a document repository of a server computer system.

The present invention further comprises determination of access controls defined in a database to protect structured information in a document, and utilization of LBAC policies for the access controls defined in the database to protect unstructured information in the document based on a user's unique credentials. Further, the user's unique credentials are utilized to identify and match protected information that can be extracted in the document for the user based on the LBAC policies defined in the database for the user. For example, LBAC policies allow the extraction of privileged information in structured documents defined in the database for the user, and matches the same privileged information in unstructured documents defined in the database for the same user.

In one preferred embodiment, a client computing device receives a request from a user or requestor to access and view one or more documents containing information. The document can be, for example, data records, including, financial reports stored a financial database system, medical records stored a hospital database system, a web page operating over a network server computer, an email message provided from an email network, or other data records that can be sanitized or redacted for viewing for a specific user, in accordance with an embodiment of the present invention.

In particular, the document is taken as input, along with the identity of the user, the user being the intended viewer of the document. In addition, the client computing device authenticates the user's credentials to determine if the user has privilege to view the one or more documents stored in a repository of a server computing device. In this case, the user's credentials are authenticated against both the client computing device and the server computing device, in accordance with embodiment of the present invention.

In another embodiment, sensitive or confidential information present in the document is extracted from the document by a program based on the LBAC policies defined for the user in a database. For example, LBAC policies are security policies defined in the database of the server computing device to extract articles in a document at columns, rows, tables, and patterns levels, based on whether the user is authorized to view the articles in the document. In one aspect, LBAC is a database access control mechanism that is present in IBM® DB2® database (IBM and DB2 are registered trademarks of International Business Machines Corporation in the United States, other countries, or both).

In one aspect of the present invention, the articles in the documents can be entities, including, for example, persons, products, diseases etc., in which the articles are defined in the document of the database, and in which the articles are associated with a set of terms, and the set of terms are defined by the context of the articles. For example, the articles in the document can be protected against disclosure to a user whom might not have privilege to view the articles in the document. In addition, once the articles are extracted from the document based on the LBAC polices, the program sends the document in a secured fashion to a redactor of the server computing device. Further, the redactor redacts the document based on the protected articles extracted based on the LBAC policies defined in the database. Thereafter, the redacted documents are sent to the client computing device and displayed to the requestor or user who has privilege to view unprotected portions of the redacted document.

Figure 1:
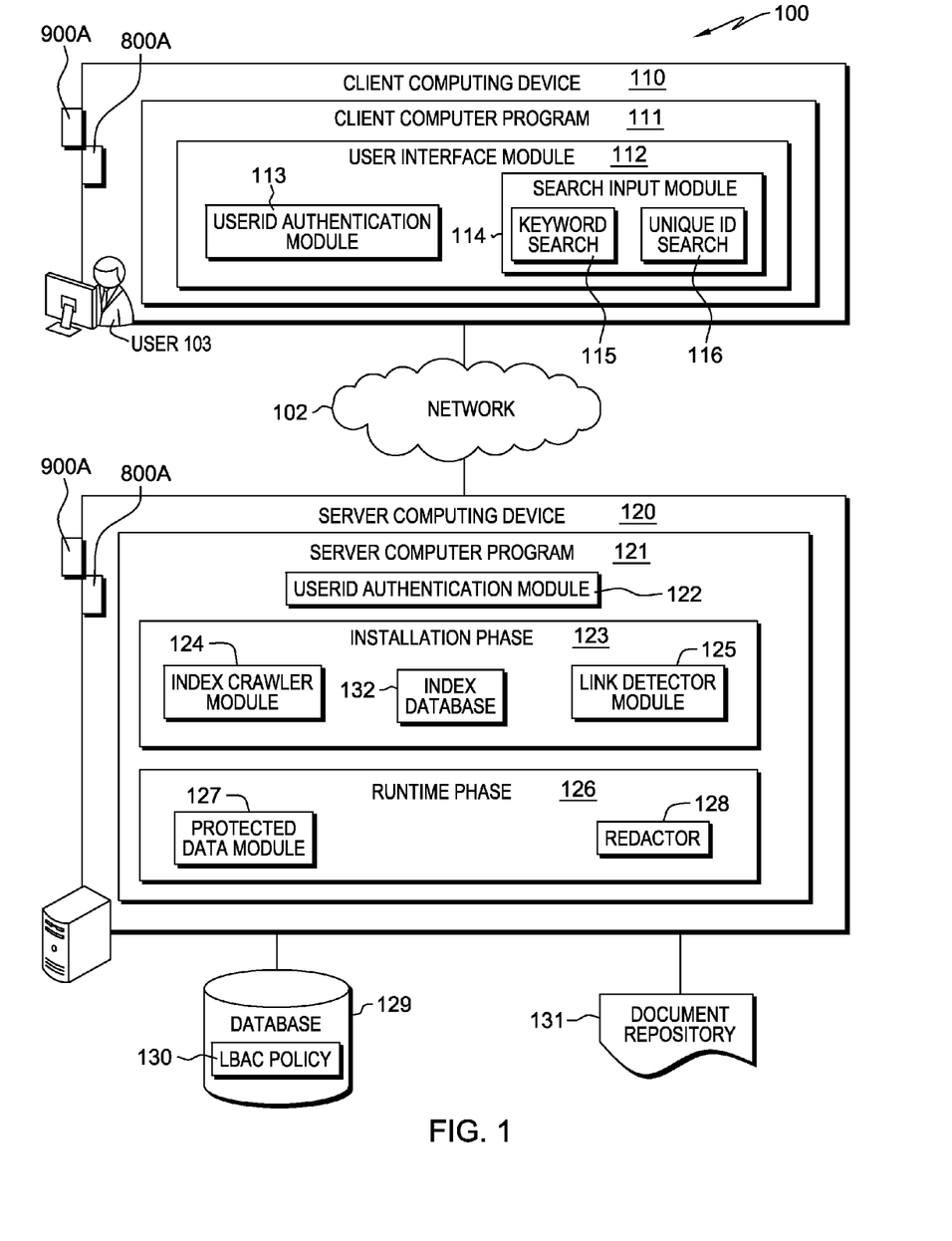
FIG. 1 illustrates an unstructured content redaction system 100 for redacting unstructured information in a document based on Label Based Access Control (LBAC) policies, in accordance with an embodiment of the present invention.

Further aspects, of the present invention will now be described in conjunction with the figures. Referring to FIG. 1, an unstructured content redaction system 100 for redacting unstructured information in a document based on LBAC policies defined in a database for a user, in accordance with an embodiment of the present invention is depicted.

Unstructured content redaction system 100 includes network 102, client computing device 110, and server computing device 120. Client computing device 110 is a client to server computing device 120, interconnected over network 102. Further, client computing device 110 operates to communicate over network 102 with server computing device 120 to facilitate redaction of sensitive or confidential information from the unstructured information in the documents. User 103 can be any type of computer user including a developer, a client/end user, system administrator or other computer user.

Client computing device 110 can be, for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively. Client computing device 110 includes client computer program 111. Client computer program 111 can be any type of software application that is compatible to retrieve and display redacted unstructured information in documents, in accordance with an embodiment of the present invention.

Server computing device 120 can be, for example, a server computer system such as a management server, a web server, or any other electronic device or computing system capable of receiving and sending data, in accordance with an embodiment of the present invention. Further, server computing device 120 can also represent a "cloud" of computers interconnected by one or more networks, where server computing device 120 can be a primary server for a computing system utilizing clustered computers when accessed through network 102. For example, a cloud computing system can be an implementation of an enterprise or business data management system adapted to manage information present in both structured relational databases and unstructured content repositories, in accordance with embodiments of the present invention.

Server computing device 120 includes server computer program 121, database 129, and document repository 131. Server computer program 121 performs all necessary functions to redact documents based on one or more keyword or unique ID search parameters submitted by user 103 via client computing device 110, as described below.

Database 129 can be any type of storage device, storage server, storage area network, redundant array of independent discs (RAID), cloud storage device, or any type of data storage. In one preferred embodiment, database 129 is a relational database management system (RDBMS). An RDBMS is a database that stores information from documents in a table, and also defines relationships among the information in the table. Specifically, the information in the documents stored in database 129 can be structured information. LBAC policy 130 is a uniquely defined access control policy in database 129 that is defined for a user, for example, user 103, based on authenticated credentials of user 103 who desires to view portions of a redacted document in client computing device 110.

Document repository 131 operates to provide storage, versioning, metadata, security, as well as indexing and retrieval of documents, in accordance with an embodiment of the present invention. Further, document repository 131 is further adapted to store documents with unstructured information, in accordance with embodiments of the present invention. In one aspect of the present invention, articles of unstructured information in the documents stored in document repository 131 are mapped onto structured information in documents stored in database 129, as described in further details below.

Client computing device 110 and server computing device 120 each maintain respective internal components 800A and 800B and respective external components 900A and 900B. In general, client computing device 110 and server computing device 120 can be any programmable computing device as described in further detail below.

Network 102 includes one or more networks of any kind that can provide communication links between various devices and computers connected together within unstructured content redaction system 100. Network 102 can also include connections, such as wired communication links, wireless communication links, or fiber optic cables. In addition, network 102 can be implemented as a number of different types of networks, including, for example, an intranet, a local area network (LAN), or a wide area network (WAN).

In the depicted embodiment, client computer program 111 retrieves and displays information accessible via network 102, such, for example, displaying a copy of one or more redacted documents. The redacted document can be displayed in a user interface of client computing device 110 for viewing by user 103. In this case, user 103 has access or privilege to view portions of the redacted document. In particular, client computer program 111 can be a web browser, a standalone web page data management application, a data management software application, or part of a service that operates to monitor management of sensitive or confidential information in a document. Examples of web browsers can include Internet Explorer® (Internet Explorer is a trademark of Microsoft Inc., in the United States, other countries, or both), Firefox® (Firefox is a trademark of Mozilla Corporation, in the United States, other countries, or both), Safari® (Safari is a trademark of Apple, Inc. in the United States, other countries, or both) and Google Chrome™ (Google Chrome is a trademark of Google, Inc. in the United States, other countries, or both), respectively.

Further, a web page or software application received in client computer program 111 can include program code, such as HyperText Markup Language (HTML) code or JavaScript code that, when executed, adds one or more user interface elements to a user interface of client computer program 111. In one preferred embodiment, the present invention utilizes Django web framework, a high level Python web framework that encourages rapid development and pragmatic design.

Client computer program 111 includes user interface module 112. User interface module 112 is a plug-in or add-on software application that extends the functionality of client computer program 111 by adding additional user interface elements to a user interface of client computer program 111. The additional user interface elements operate to authenticate credentials of user 103, and determine how much information in a document, if any, user 103 can be permitted to view. Further, the additional user interface elements can also determine what types of access restrictions can be placed on the document that can be accessed in server computing device 120 based on the authenticated credentials of user 103.

User interface module 112 includes userID authentication module 113 and search input module 114. In one preferred embodiment, userID authentication modules 113, 122 operate in a traditional manner to validate userIDs and passwords that are entered to permit access to client computer program 111 of client computing device 110 and server computer program 121 of server computing device 120, respectively. In particular, a userID and password is submitted by user 103 as unique credentials that are defined in database 129 for user 103, based on LBAC policies 130. The LBAC policies 130 operate to define whether user 103 is permitted to view specific portions of redacted information in documents in document repository 131. One the other hand, unique credentials of user 103 are also authenticated by userID authentication module 122 of server computer program 121 once user 103 submits her credentials in search input module 114, in accordance with an embodiment of the present invention.

Once the unique credentials of user 103 are authenticated, search input module 114 allows user 103 to search for relevant structured and unstructured information in documents user 103 desires to view. For example, search input module 114 receives an input that indicates an intention by user 103 to selectively view information from sensitive portions of accessed documents stored in document repository 131. In this case, user 103 can search document repository 131 by search parameters including, for example, by keyword search 115 or alternatively, the user can search document repository 131 by unique ID search 116.

In the case of keyword search 115, an index crawler of server computing device 120 determines all documents IDs in document repository 131 that are relevant to a specific keyword search 115, as described below. For example, for each keyword search 115, a list of documents pertaining to a keyword is identified by server computer program 121 in document repository 131. In addition, in the case of unique ID search 116, unique ID search 116 directly maps at least one or more documents in document repository 131 that corresponds to unique ID search 116, as described below. In one embodiment, after the search parameter is determined, client computer program 111 can send the search parameters to server computer program 121 in response to user 103 pressing a search button (Not shown) in client computing device 110. Once the search parameters are received, server computer program 121 performs all necessary functions to redact documents based on the search parameters including keyword search 115 or unique ID search 116, submitted by user 103 in client computing device 110.

In one preferred embodiment, server computer program 121 performs the operations to search and redact documents for a user during the operation of installation phase 123 and runtime phase 126. In one embodiment, installation phase 123 operates to reduce the amount of time that might be required for server computer program 121 to search and redact the documents for user 103, in accordance with embodiments of the present invention.

Installation phase 123 includes index crawler module 124, index database 132 and link detector module 125. During the operation of installation phase 123, index crawler module 124 operates to collect documents present in document repository 131 as input, and store the documents in index database 132. In this case, each keyword search 115 or unique ID search 116 from the search parameters that might be present in the document is identified in document repository 131 by index database 132. Thereafter, a mapped form of a keyword or unique ID present in the document is stored in index database 132 by index crawler module 124. In this manner, the mapped document is easily accessible for retrieval based on the search parameters submitted to server computer program 121.

In one embodiment, the mapped form of the document is a document ID that corresponds to keyword search 115 or unique ID search 116 of the search parameters submitted to server computer program 121 by client computer program 111. Therefore, any keyword search 115 or unique ID search 116 pertaining to one or more search parameters supplied by user 103 in user interface module 112 is searched and indentified in index database 132 by server computer program 121 as a documentID.

Link detector module 125 operates to match and identify a link between documents stored in document repository 131 and documents in database 129. Specifically, link detector module 125 matches each document in document repository 131 with a corresponding record ID of a document stored in database 129. Further, link detector module 125 creates a link between the matched documents. This link represents connection or link between documents stored in database 129 and document stored in document repository 131. For example, link detector module 125 creates the link by matching a search parameter including keyword search 115 or unique ID search 116 that pertain to documents in database 129 and document repository 131.

During the operation of runtime phase 126, server computer program 121 operates to dynamically identify, extract, and redact information from documents which are protected from viewing for user 103. Runtime phase 126 includes protected data module 127 and redactor 128. Protected data module 127 determines what information needs to be redacted in a document in document repository 131.

Protected data module 127 periodically scans database 129 and determines what document is linked between database 129 and document repository 131 by link detector module 125. In one preferred embodiment, protected data module 127 utilizes LBAC policy 130 in database 129 to extract articles of information in a document that is protected from viewing from user 103 based on authenticated credentials of user 103 in client computing device 110.

LBAC policy 130 is an access control security policy defined in database 129 to extract articles of information in the document as columns, rows, tables, and pattern levels, based on whether user 103 is authorized to view the articles in the document. For example, database 129 contains tables, and each table consist of columns and record IDs. Further, each record ID present in database 129 represents the articles in the document which can be related to each other. Further, the articles in the documents can be entities, including, for example, persons, products, diseases etc., in which the articles are defined in the document of database 129, and in which the articles are associated with a set of terms, and the set of terms are defined by the context of the articles. For example, the articles in the document can be protected against disclosure to a user whom might not have privilege to view the articles in the document. In particular, LBAC policy 130 defines access control policies for a user, for example, user 103, and assigns labels based on authenticated credentials of user 103 for each row and column in documents stored in database 129.

In one preferred embodiment of the present invention, LBAC policy 130 is defined in database 129 based (1) security label component, (2) security policy component, and (3) security label. For example, security label component is a database article that is defined in database 129 based on credentials of user 103, who intends to access the article in the document. For example, a security label component can be separated into three types of security functions that are defined in database 129, including, for example, a set function, an array function, and a tree function.

The set function can be used to define the same access levels for article in the documents. An array function defines a linear level access for the articles. Further, a tree function can be used to define complex hierarchies of various users. For example, a tree function can be defined in the aspect of one article having several articles that are linked to the one article. In addition, a security label consists of security label components. A security label can be of three types, (1) user security label, which is defined in database 129 based on the authenticated credentials of user 103 (2) column security label, which is associated with the columns of a table in the articles of the document, and (3) row security label, which is associated with the rows of the table in the articles of the document. Further, a security policy defines access rules and label types based on authenticated credentials that are defined for user 103 in database 129.

In particular, protected data module 127 scans database 129, extracts information in documents based on mechanisms defined in LBAC policy 130 for user 103, and abstracts the information based on 1) security label component, (2) security policy component, and (3) security label security levels that allows database 129 to identify exacted rows and columns from a document which are not accessible to user 103. Further, protected data module 127 queries database 129 and determines actual articles stored in each protected rows and columns. Thereafter, protected data module 127 generates a set of {Key:Value} pairs. Specifically, this information is precisely the information which needs to be redacted from a document based on authenticated credentials defined in database 129 for user 103. For example, [Invoice no: 20071735, Phone no: 90873746619] can be an example of a key value pair determined by protected data module 127. In this case, the protected pattern also follows the same data format as {Key:Value} pairs, except that {Key:Value} pairs now becomes {Key:Pattern} pairs.

Protected data module 127 further operates to generate patterns for each column that is accessible for viewing by user 103, either by considering a data type of the column or discovering a pattern from all the values present in the column. In one aspect, protected patterns are extracted by LBAC policy 130 and generated for each column by protected data module 127 as soon as user 103 is successfully authenticated by userID authentication modules 113, 122 to permit access to client computer program 111 and server computer program 121, respectively. This is possible because extraction of documents based on LBAC policy 130 only requires login credentials of user 103 who desires to log into client computer program 111 and server computing device 120 to view documents based on whether user 103 is permitted to view specific articles in the documents. In addition, protected data module 127 sends information containing the {Key:Value/Key:Pattern} to redactor 128 along with corresponding document ID, in accordance with embodiments of the present invention.

In one preferred embodiment, protected data module 127 of server computer program 121 can be defined in the following syntax for document redaction of unstructured information, in accordance with an embodiment of the present invention:

```
PROTECT <$$Entities to be protected> AND <$$Protected Pattern>
    FROM <Doc ID>
    FOR <UserID>
```

The above syntax will be interpreted as follows:
    <$$Entities>: This is list of protected entities (LBAC policy), which will be retrieved by the system at runtime from database.
    <$$Protected Pattern>: This is list of protected patterns derived and stored in a temporary file, and is retrieved by the system at runtime
    <Doc ID>→Unique Identification of the document user is accessing. As soon as user tries to access the document either by a set of keywords or document identifier, the document IS will be collected by the system.
    <UserID>→User ID logged-in in the work flow environment and accessing the particular document.

Redactor 128 is configured to redact portions of information from a document, in accordance with embodiments of the present invention. Redactor 128 redacts certain portions of information contained in the document while not redacting other portions of the document. In one aspect, redactor 128 can redact the document without affecting the structure of the document. For example, user 103 can view a medical record for a patient in a hospital medical records system, however, it can be desired for the hospital medical records system to redact certain portions of the document based on the user's privilege or access right to view the document. In this case, documents pertaining to the medical record for a specific patient can be dynamically redacted by redactor 128 based on credentials of user 103 to view information in the medical records.

Redactor 128 receives information containing multiple elements of the form {Key:Value/Key:Pattern} and a documentID from protected data module 127, and sends a set of redacted documents to client computer program 111 to be displayed in a user interface of user interface module 112 for user 103. In particular, redactor 128 outputs a masked document to client computer program 111 that includes values and patterns present in {Key:Value/Key:Pattern} pairs that are protected from viewing from user 103.

Further, redactor 128 generates regular expressions based on data types of the value pairs it encounters, and is capable of utilizing fuzzy matching, in accordance with an embodiment of the present invention. For example, one form "9087374619" can be a numeric value in a document stored in database 129. However, in a structured text document, another form of "9087374619" can be represented in the document in the following manner "9087-374-619". In this case, utilizing a fuzzy logic mechanism, redactor 129 can successfully match these two forms/values and redact them by replacing "90887-374-619" as appearing in the document with a fixed length string "XXXXX". Similarly, patterns of a protected column containing cheque/draft numbers can be represented in the form of cheque/draft numbers. In this case, every successful match in the document is replaced by fixed length string in the form of "XXXXX". Specifically, by utilizing fuzzy matching mechanisms, redactor 128 replaces each protected value by a fixed length string and ensures that no information pertaining to the length of the protected value is leaked in the redacted document that is displayed to user 103 in client computing device 110.

In another embodiment, redactor 128 utilizes a white listing mechanism that enables redactor 128 to identify information that cannot be redacted for viewing by a specific user. In this case, white listing is utilized by redactor 128 to store all values that need to be white listed in a new line. In this manner, before redactor 128 starts the redaction process, redactor 128 reads a text file and replaces each of the white listed items with a long random whitening string. Thereafter, redactor 128 performs redaction on the document in the usual manner. Once the redaction process is complete, the long random whitening strings are replaced back with the original values.

Figure 2:
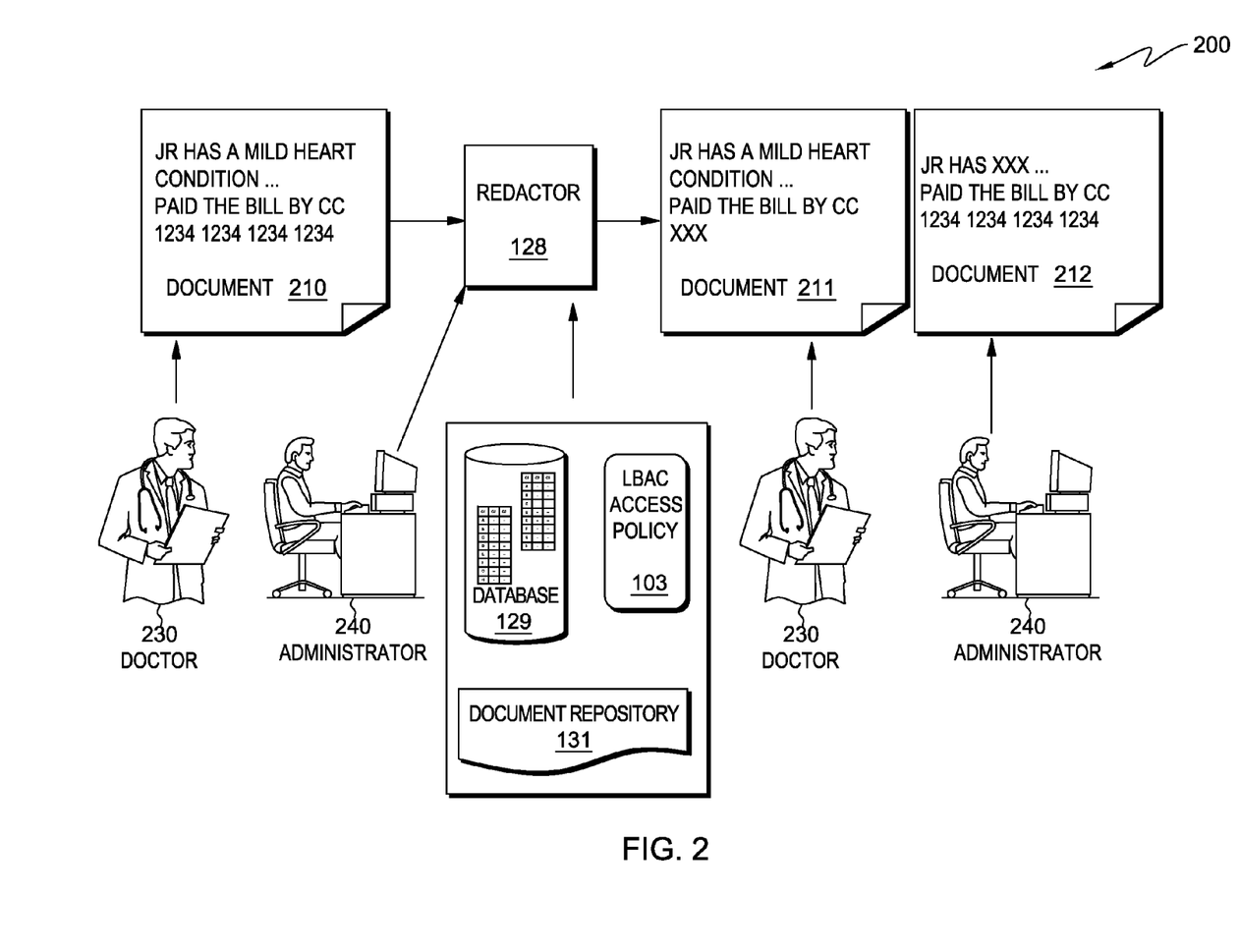
FIG. 2 illustrates a workflow environment 200 in which unstructured information from a document stored in a document repository 131 is redacted by redactor 128 of server computer program 121 of FIG. 1, in accordance with an embodiment of the present invention.

FIG. 2 depicts a workflow environment 200 in which a document is redacted by server computer program 121 of FIG. 1, in accordance with an embodiment of the present invention. Workflow environment 200 represents a medical domain in which a patient's diagnosis report contains potentially sensitive information in a form of a medication, symptoms, diseases diagnosed etc., and at the same time, the patient's diagnosis report also contains personal financial information or contact information. Various embodiments of the present invention operate in domains besides the medical domain, such as the financial services domain, government records domain, or educational domain, for example.

For example, document 210 includes both medical and financial information pertaining to patient JR. In this case, the document includes the information "JR has a mild heart condition . . . paid bill by CC 1234 1234 1234 1234". Thus, doctor 230 is privileged to view information noting "JR has a mild heart condition", but doctor 230 does not have privilege to view "paid the bill by CC 1234 1234 1234 1234". On the other hand, administrator 240 is privileged to view information pertaining "paid the bill by CC 1234 1234 1234 1234", but administrator 240 is not privileged to view information pertaining to "JR has a mild heart condition". In particular, doctor 230 or administrator 240 send the information to redactor 128 of server computer program 121 of FIG. 1.

Redactor 128 redacts document 210 based on LBAC policy 130 access control policies specifically defined in database 129 for both doctor 230 and administrator 240. Thereafter, redactor 128 redacts information in document 210 based on credentials of doctor 230 and administrator 240, to produce document 211 and document 212. In the case of doctor 230, a redacted document 211 includes only information pertaining to JR medical condition i.e., "JR has a mild heart condition . . . paid the bill by CC XXX". On the other hand, document 212 does not contain sensitive information that can be viewed by administrator 240. For example, document 212 depicts information including "JR has XXX . . . paid the bill by CC 1234 1234 1234 1234". In this case, administrator 240 is not permitted to view information relating to JR's medical condition.

Figure 3:
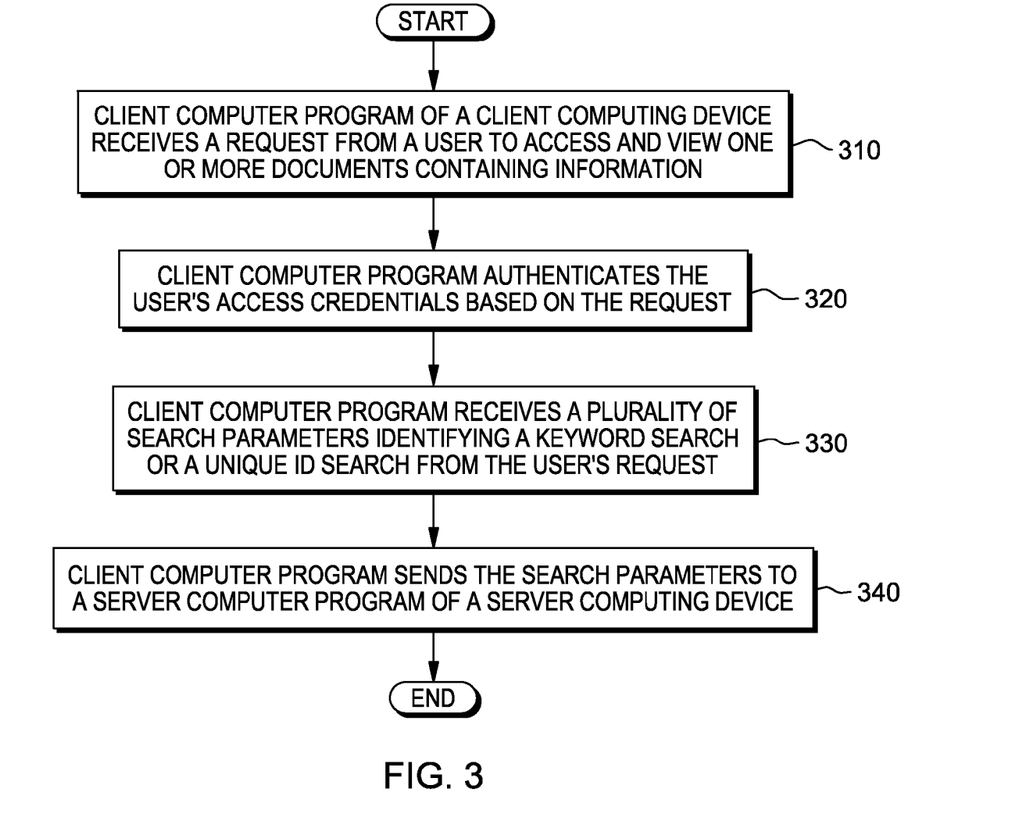
FIG. 3 is a flowchart depicting the steps performed by client computer program 111 of client computing device 110 of FIG. 1, in accordance with an embodiment of the present invention.

FIG. 3 is a flowchart depicting the steps performed by client computer program 111 of client computing device 110 of FIG. 1, in accordance with an embodiment of the present invention.

In step 310, client computer program 111 of client computing device 110 receives a request from user 103 to access and view one or more documents containing information. In particular, user 103 submits credentials including, for example, a userID or a password in user interface module 112. Further, user 103 also submits a request to gain permission to view sensitive information in documents stored in document repository 131. In step 320, userID authentication module 113 of client computer program 111 authenticates the credentials for user 103. In one example, the unique credentials of user 103 are also authenticated by userID authentication module 122 of server computer program 121 once user 103 submits her credentials to search input module 114 to view documents stored in document repository 131.

In step 330, client computer program 111 receives a plurality of search parameters including one or more search parameters that identify keyword search 115 or a unique ID search 116. In particular, the search parameters are submitted in search input module 114 by user 103. In step 340, client computer program 111 sends the search parameters to server computer program 121 of server computing device 120. For example, client computer program 111 can send the search parameters to server computer program 121 in response to user 103 pressing a search button in client computing device 110.

Figure 4:
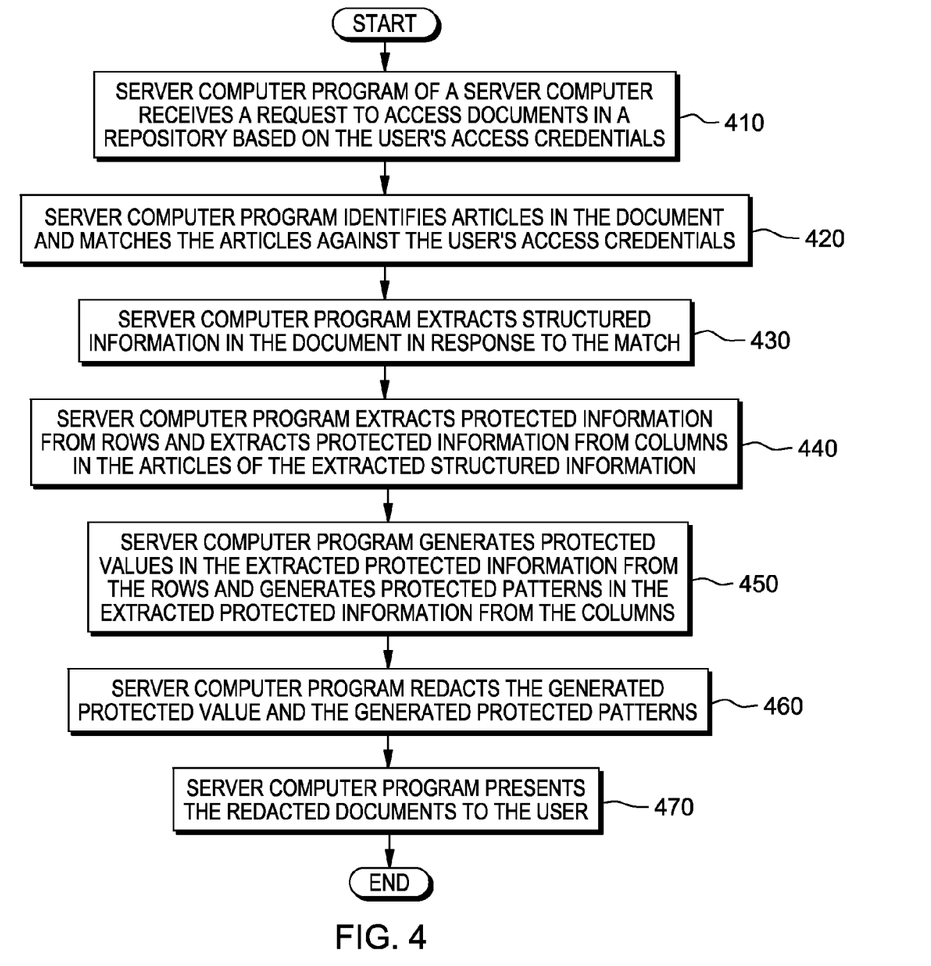
FIG. 4 is a flowchart depicting the steps performed by server computer program 121 of server computing device 120 of FIG. 1, in accordance with an embodiment of the present invention.

FIG. 4 is a flowchart depicting the steps performed by server computer program 121 of server computing device 120 of FIG. 1, in accordance with an embodiment of the present invention.

In step 410, server computer program 121 receives search parameters including a request from user 103 or another requestor to access and view sensitive information in documents stored in document repository 131 based on the credentials of user 103. Particularly, the credentials of user 103 are authenticated by userID authentication module 122 once user 103 submits her credentials to search input module 114 of client computer program 111 to view sensitive information in documents stored in document repository 131.

In step 420, server computer program 121 identifies articles in the documents stored in document repository 131, and matches the articles against the credentials of user 103. For example, each keyword search 115 or unique ID search 116 from the search parameters that might be present in a document is identified in document repository 131 by index database 132, and thereafter, a mapped form of the keyword or unique ID present in the document is stored in index database 132 and thus, the mapped document is easily accessible for retrieval based on the search parameters submitted to server computer program 121. The mapped form of the document is a document ID that corresponds to keyword search 115 or unique ID search 116 of the search parameters In step 430, server computer program 121 extracts structured information stored in database 129 and matches the information against the mapped document ID stored in document repository 131. Specifically, protected data module 127 periodically scans database 129 and determines what document is linked between database 129 and document repository 131. For example, protected data module utilizes LBAC policy 130 in database 129 to extract articles of information that are protected from viewing from user 103 based on authenticated credentials of user 103. In step 440, protected data module 127 of server computer program 121 extracts protected information based on both rows and column levels in the articles of the document in the document repository 131, based on LBAC policy 130 access controls defined in database 129 for the requestor, such as, for example user 103 of FIG. 1. In one aspect, the articles of documents in document repository 131 are unstructured.

In step 450, protected data module 127 of server computer program 121 generates protected values in the extracted protected information from the row and generates protected patterns in the extracted protected information from the columns. For example, protected data module 127 generates information containing {Key:Value/Key:Pattern} based on the extracted information in rows and columns. Protected data module 127 then sends this information to redactor 128.

In step 460, redactor 128 of server computer program 121 redacts the generated protected value and the generated protected patterns in the form of {Key:Value/Key:Pattern} based on the extracted information in rows and columns. For example, redactor 128 receives information containing {Key: Value/Key:Pattern} and a documentID from protected data module 127, and sends a set of redacted documents to client computer program 111 to be displayed in a user interface of user interface module 112 for user 103. In step 470, server computer program 121 sends the redacted document to client computer program 111 for display to user 103 in user interface module 112.

Figure 5:
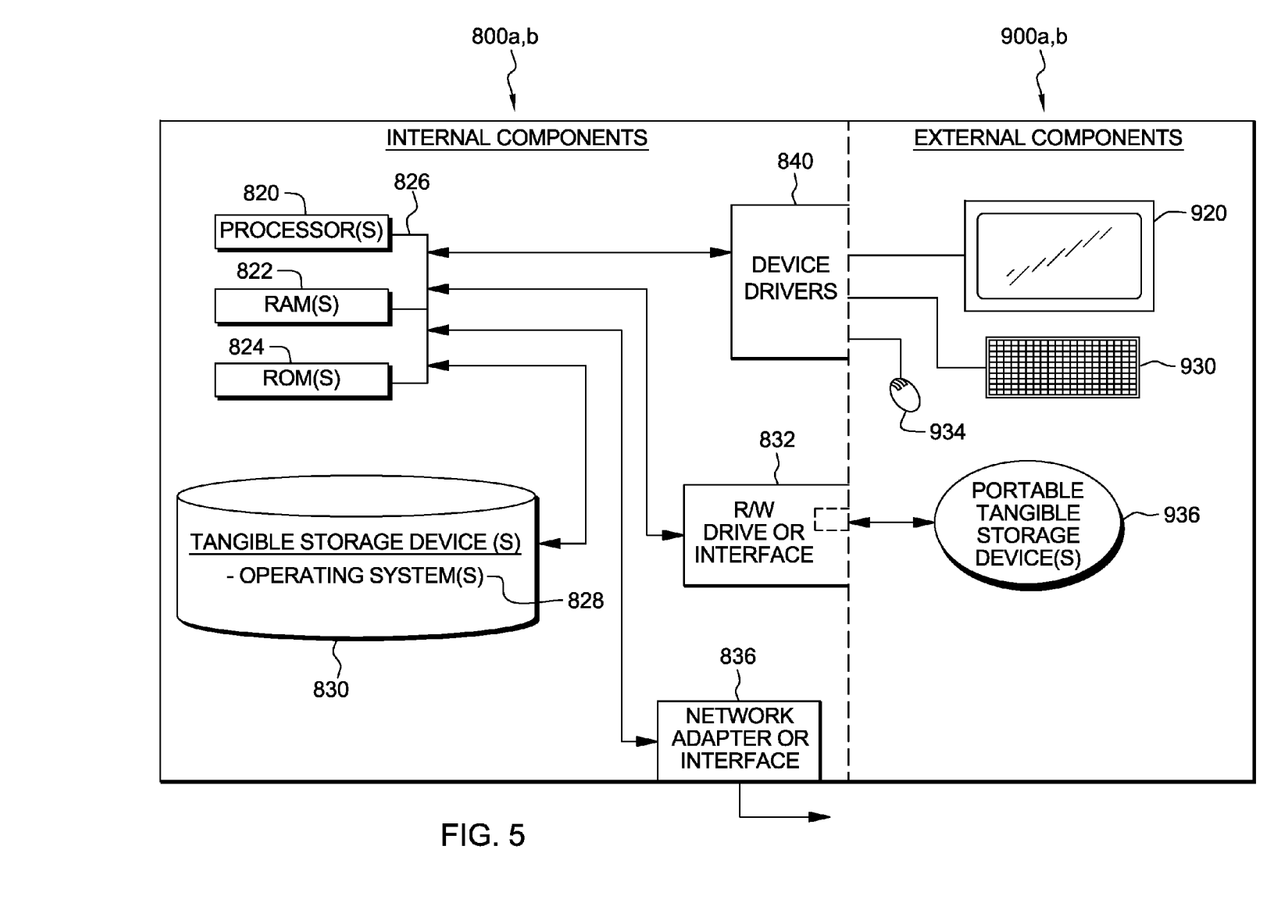
FIG. 5 illustrates a block diagram of the components of a computer, such as client computing device 110 and server computing device 120 of FIG. 1, in accordance with an embodiment of the present invention.

FIG. 5 illustrates a block diagram of the components of a computer, such as client computing device 110 and server computing device 120 of FIG. 1, in accordance with an embodiment of the present invention.

Client computing device 110 include respective set of internal components 800a and external components 900a, and server computing device 120 include set of internal components 800b and a set of external components 900b, illustrated in FIG. 1. Each of the sets of internal components 800a,b includes one or more processors 820, one or more computer-readable RAMs 822 and one or more computer-readable ROMs 824 on one or more buses 826, one or more operating systems 828 and one or more computer-readable tangible storage devices 830. The one or more operating systems 828 and client computer program 111 (client computing device 110) and server computer program 121 (for server computing device 120) are stored on one or more of the respective computer-readable tangible storage devices 830 for execution by one or more of the respective processors 820 via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b also includes a RAW drive or interface 832 to read from and write to one or more portable computer-readable tangible storage devices 936 such as a CD-ROM, DVD, memory stick, magnetic tape, magnetic disk, optical disk or semiconductor storage device. The client computer program 111 (client computing device 110) and server computer program 121 (for server computing device 120) can be stored on one or more of the respective portable computer-readable tangible storage devices 936, read via the respective RAW drive or interface 832 and loaded into the respective hard drive or semiconductor storage device 830.

Each set of internal components 800a,b also includes a network adapter or interface 836 such as a TCP/IP adapter card or wireless communication adapter (such as a 4G wireless communication adapter using OFDMA technology). The client computer program 111 (client computing device 110) and server computer program 121 (for server computing device 120) can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830.

The network may comprise copper wires, optical fibers, wireless transmission, routers, firewalls, switches, gateway computers and/or edge servers.

Each of the sets of external components 900a,b includes a display screen 920, a keyboard or keypad 930, and a computer mouse or touchpad 934. Each of the sets of internal components 800a,b also includes device drivers 840 to interface to display screen 920 for imaging, to keyboard or keypad 930, to computer mouse or touchpad 934, and/or to display screen for pressure sensing of alphanumeric character entry and user selections. The device drivers 840, R/W drive or interface 832 and network adapter or interface 836 comprise hardware and software (stored in storage device 830 and/or ROM 824).

The programs can be written in various programming languages (such as Java, C+) including low-level, high-level, object-oriented or non object-oriented languages. Alternatively, the functions of the programs can be implemented in whole or in part by computer circuits and other hardware (not shown).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In addition, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method and system for preventing information leakage from a document based on LBAC policies has been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. Therefore, the present invention has been disclosed by way of example and not limitation.

What is claimed is:

1. A computer system for preventing information leakage from a document, the computer system comprising:
  one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions to receive a request to access documents in a repository, wherein the request includes a plurality of search parameters including a parameter indentifying a keyword search or a parameter identifying a unique ID search of the document;
program instructions to match articles in the document against access credentials of a requestor, wherein the plurality of search parameters are merged with the matched articles in the documents based on the access credentials of the requestor;
program instructions to extract structured information in the document;
program instructions to extract protected information from rows and columns from the articles of the extracted structured information based on label access controls, wherein the label access controls define one or more security policies in the repository, and wherein the one or more security policies determine whether the requestor has privilege to access information in the repository based on the access credentials of the requestor;
program instructions to generate protected values in the extracted protected information from the rows and generate protected patterns in the extracted protected information from the columns; and
program instructions to redact the generated protected values and protected patterns.

2. The computer system of claim 1, wherein the repository is unstructured.

3. The computer system of claim 1, wherein the program instructions to generate protected values based on the rows and generating protected patterns based on the columns comprises:
   program instructions to identify values stored on the rows and the columns; and
   program instructions to identify patterns stored in the columns based on the values stored in the columns.

4. The computer system of claim 1, wherein the program instructions to receive the request to access documents in a repository, comprises:
   program instructions to receive a request from a requestor to access one or more documents containing information; and
   program instructions to authenticate access credentials of the requestor.

5. The computer system of claim 1 wherein the plurality of search parameters are merged with documents in the repository, and wherein the computer system further comprising:
   program instructions, stored on at least one of the one of more storage devices for execution by at least one or more processors via at least one of the one or more memories, the program instructions comprising:
   program instructions to generate a documentID for each search parameter that is merged with the document.

6. The computer system of claim 5, further comprising:
program instructions, stored on at least one of the one of more storage
devices for execution by at least one or more processors via at least one of the one or more memories, the program instructions comprising:
program instructions to verify that the requestor has privilege to access a row in the document ID, and wherein if a row is not accessible to the requestor, all values in the row are extracted, and a protected pattern is generated by the computer system.

7. A computer program product for preventing information leakage from a document, the computer program product comprising:
   one or more computer-readable tangible storage devices and program instructions stored on at least one of the one or more storage devices, the program instructions comprising:
   program instructions to receive a request to access documents in a repository, wherein the request includes a plurality of search parameters including a parameter indentifying a keyword search or a parameter identifying a unique ID search of the document;
   program instructions to match articles in the document against access credentials of a requestor, wherein the plurality of search parameters are
   merged with the matched articles in the documents based on the access credentials of the requestor;
   program instructions to extract structured information in the document;
   program instructions to extract protected information from rows and columns from the articles of the extracted structured information based on label access controls, wherein the label access controls define one or more security policies in the repository, and wherein the one or more security policies determine whether the requestor has privilege to access information in the repository based on the access credentials of the requestor;
   program instructions to generate protected values in the extracted protected information from the rows and generate protected patterns in the extracted protected information from the columns; and
   program instructions to redact the generated protected values and protected patterns.

8. The computer program product of claim 7, wherein the repository is unstructured.

9. The computer program product of claim 7, wherein the program instructions to generate protected values based on the rows and generating protected patterns based on the columns comprises:
   program instructions to identify values stored on the rows and the columns; and
   program instructions to identify patterns stored in the columns based on the values stored in the columns.

10. The computer program product of claim 7, wherein the program instructions to receive the request to access documents in a repository, comprises:
    program instructions to receive a request from a requestor to access one or more documents containing information; and
    program instructions to authenticate access credentials of the requestor.

11. The computer program product of claim 7, wherein the plurality of search parameters are merged with documents in the repository, and wherein the computer system further comprising:
    program instructions, stored on at least one of the one of more storage devices for execution by at least one or more processors via at least one of the one or more memories, the program instructions comprising:
    program instructions to verify that the requestor has privilege to access a row in a document ID, and wherein if a row is not accessible to the requestor, all values in the row are extracted, and a protected pattern is generated by the computer system.

* * * * *